United States Patent
Nakazawa et al.

(10) Patent No.: US 7,123,018 B2
(45) Date of Patent: Oct. 17, 2006

(54) SWITCHING STATUS DETERMINATION DEVICE AND METHOD FOR DETERMINING SWITCHING STATUS

(75) Inventors: Atsushi Nakazawa, Anjo (JP); Nobutomo Takagi, Okazaki (JP)

(73) Assignee: Denso Corporation, Kariya (JP)

( * ) Notice: Subject to any disclaimer, the term of this patent is extended or adjusted under 35 U.S.C. 154(b) by 487 days.

(21) Appl. No.: 10/445,910

(22) Filed: May 28, 2003

(65) Prior Publication Data

US 2003/0229403 A1   Dec. 11, 2003

(30) Foreign Application Priority Data

Jun. 5, 2002   (JP) .............................. 2002-164339

(51) Int. Cl.
   *G01R 31/02*   (2006.01)
(52) U.S. Cl. .................... 324/415; 324/522; 324/523
(58) Field of Classification Search ................ 324/522, 324/415, 523, 421, 418
   See application file for complete search history.

(56) References Cited

U.S. PATENT DOCUMENTS

| 3,417,323 A | * | 12/1968 | Williamson | .................. 324/421 |
| 5,040,088 A | * | 8/1991 | Harrington et al. | ............ 361/31 |
| 5,448,492 A | * | 9/1995 | Kolomyski et al. | .......... 700/293 |
| 5,581,432 A | * | 12/1996 | Wellnitz et al. | ................ 361/56 |
| 5,648,722 A | * | 7/1997 | Merry et al. | .................. 324/417 |
| 6,369,468 B1 | * | 4/2002 | Goings et al. | ............... 307/125 |
| 6,371,234 B1 | * | 4/2002 | Yasuda | ........................ 180/197 |

FOREIGN PATENT DOCUMENTS

| EP | 1 100-100 A1 | 11/2000 |
| GB | 2 351 618 | 1/2001 |
| JP | A-H01-221816 | 9/1989 |
| JP | B2-4-44065 | 7/1992 |
| JP | A-H08-107339 | 4/1996 |
| JP | A-H11-001155 | 1/1999 |

OTHER PUBLICATIONS

Communication from Canadian Intellectual Property Office dated Jun. 27, 2005.

* cited by examiner

*Primary Examiner*—Anjan Deb
*Assistant Examiner*—John Zhu
(74) *Attorney, Agent, or Firm*—Posz Law Group, PLC

(57) ABSTRACT

A sampling voltage is periodically applied between contacts of a switch of a device to determine a status of the switch. When a CPU is in a sleep state and the status of the switch is determined closed, the CPU is activated. The sampling voltage when the CPU is in the sleep state is adjusted lower than the one when the CPU is in the wakeup state. This reduces power consumption for the switch status determination. The sampling voltage adjusted at the lower level periodically adjusted to a higher level to reduce errors in the determination due to insulation films on the contacts.

11 Claims, 2 Drawing Sheets

SWITCHING STATUS DETERMINATION DEVICE AND METHOD FOR DETERMINING SWITCHING STATUS

CROSS REFERENCE TO RELATED APPLICATION

This application is based on and incorporates herein by reference Japanese Patent Application No. 2002-164339 filed on Jun. 5, 2002.

FIELD OF THE INVENTION

The present invention relates to a switching status determination device and a method for determining a switching status.

BACKGROUND OF THE INVENTION

A switching status determination device is used in a control device that controls other devices in a vehicle based on a status of manual switches. The device determines the status of the manual switches, whether they are open or closed. One of such devices is disclosed in JP-B2-4-44065. In this device, a voltage is periodically applied between contacts of a switch. Then, it is determined whether current flows between the contacts while the voltage is applied. The status of the switch is determined based on the current flowing condition.

In recent years, more and more electronic devices are installed in a vehicle, and a total amount of the power consumption increases. Therefore, the power consumption of the switching status determination device is required to be reduced. Especially, when the vehicle is halted, the power consumption should be maintained low. A reduction in the battery power consumption is required to improve a restart ability of the vehicle after a long halting period. To satisfy the requirement, the DC voltage that is periodically applied between the contacts is lowered to reduce the current passed for the detection.

Surfaces of the contacts are coated with insulation films. To perform an accurate determination of the switching condition, the insulation films should be removed by the current that flows between the contacts when the switch is closed. If the DC voltage is low, the sufficient current does not flow between the contacts to break the insulation films. Thus, the accurate determination cannot be performed.

SUMMARY OF THE INVENTION

The present invention therefore has an objective to provide a switching status determination device that accurately determines a status of a switch, which is open or closed. The present invention has another objective to provide a method for accurately determining the status of the switch without affected by an insulation film on contacts of the switch while power consumption for the determination is maintained low.

In a switching status determination device of the present invention, a voltage application circuit periodically applies a DC voltage to contacts of a manual switch. A determination circuit determines whether a current is passed between the contacts by the voltage application and decides a status of the switch, which is open or closed. The result of the decision is sent to a control device that controls an operation of a device based on the status of the switch.

A voltage adjustment circuit is provided to adjust the DC voltage to at least two levels: high or low. For instance, the DC voltage is set to a constant level and periodically adjusted to a high level. By setting the voltage, which is periodically applied to the contacts, to a low level, the power consumption for the determination is lowered. Furthermore, a large amount of current is passed by periodically adjusting the voltage to the high level. As a result, the film on the contacts is removed by the current and the contacts are more likely to conduct. With this configuration, the device performs an accurate determination of the switching status while the power consumption for the determination is lowered.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
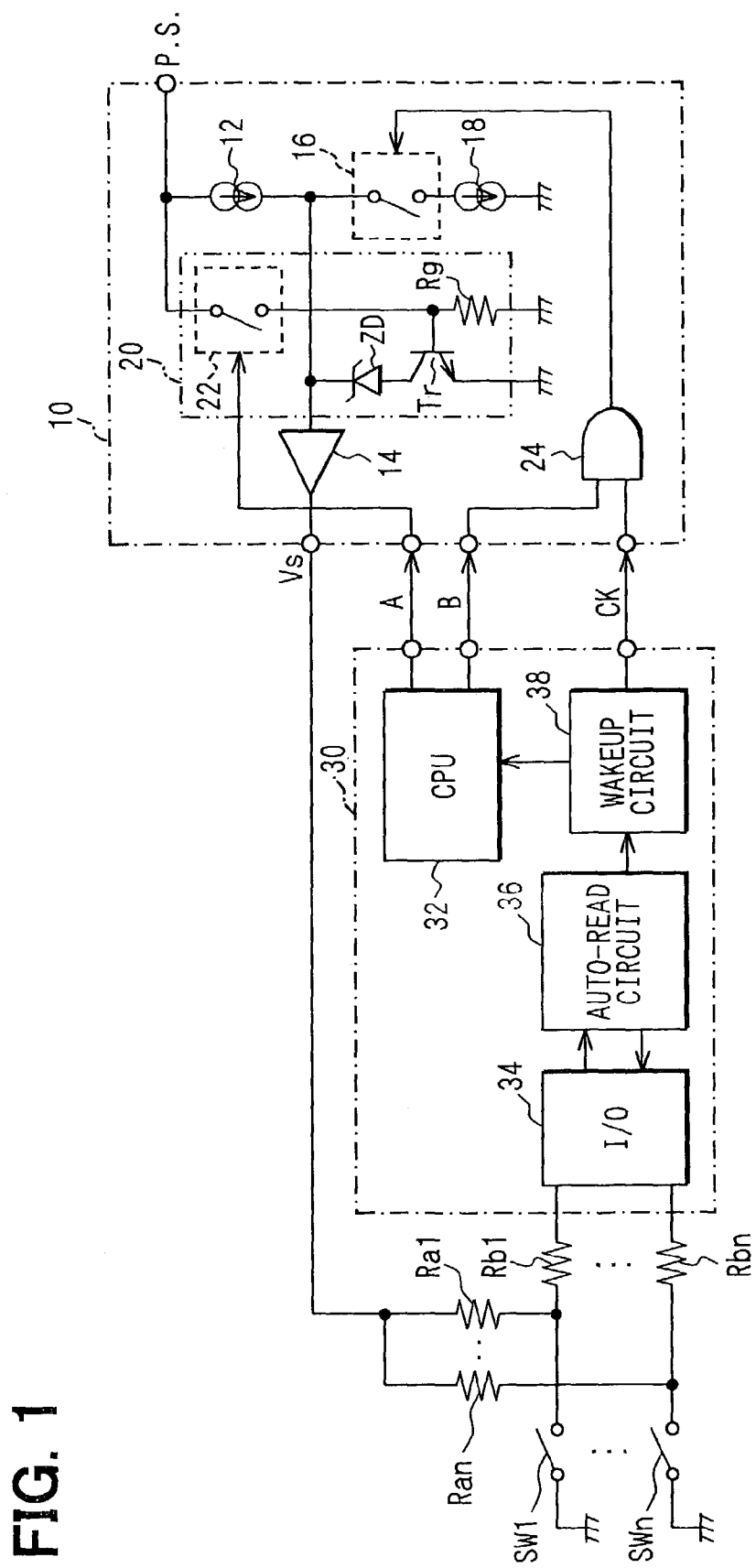
FIG. 1 is a block diagram showing a switching status determination device according to an embodiment of the present invention.
Figure 2:
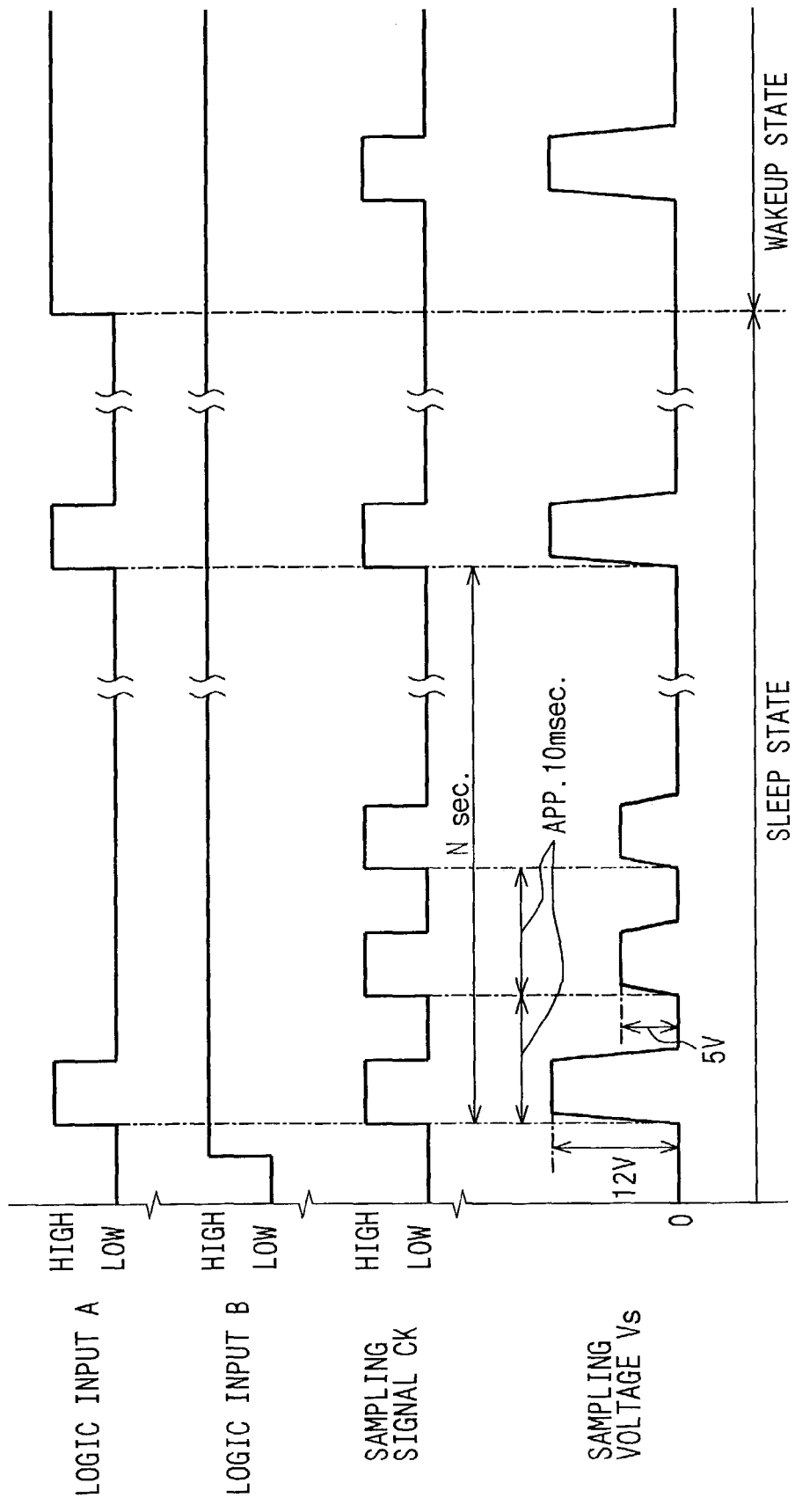
FIG. 2 is a timing chart showing operations of the switching status determination device.

The preferred embodiments of the present invention will be explained with reference to the accompanying drawings. Referring to FIG. 1, the switching status determination device includes a custom IC 10 and a microcomputer 30. The device determines status of each switch SW1–SWn used for manual operations of electronic devices, such as door locks and power windows, installed in a vehicle. The custom IC 10 applies a DC voltage (a sampling voltage) between contacts of each switch SW1–SWn via a respective resistor Ra1-Ran to determine the status of the switch SW1–SWn.

The microcomputer 30 controls timing of a sampling voltage application to the contacts. It determines the status of the switch SW1–SWn based on whether a current is passed between the contacts by the sampling voltage application. The microcomputer 30 controls devices, which manually operated via the switch SW1–SWn, based on the determination result. The manually operated devices include a door lock actuator and a power window actuator.

In the custom IC 10, an output path is provided for outputting the sampling voltage Vs to the switch SW1–SWn. A source voltage is applied by an external power source P.S., such as an onboard battery, to the custom IC. Then, the sampling voltage Vs is outputted via the first constant-cunent circuit 12 and the buffer 14. 12 and the buffer 14.

The second constant-current circuit 18 is connected between the first circuit 12 and the buffer 14 via a switching circuit 16. The second circuit 18 passes a current from the first circuit 12 to the ground to set the voltage at the output path to a ground voltage (0V). A clamp circuit 20 is also connected between the first circuit 12 and the buffer 14. The clamp circuit 20 clamps the voltage at the output path lower than the source voltage when the switching circuit is turned off.

The clamp circuit 20 is constructed of a zener diode ZD, an npn transistor Tr, a grounding resistor Rg, and a switching circuit 22. A cathode and an anode of the zener diode ZD are connected to the output path and a collector of the transistor Tr, respectively. An emitter of the transistor Tr is grounded and a base is grounded via the grounding resistor Rg. The switching circuit 22 is closed or open to start or stop power supply from the external power source to the base of the transistor Tr.

When the switching circuit 22 is closed and the power supply to the base starts, the custom IC 10 stops outputting the voltage Vs to the contacts. When the switching circuit 22 is open and the power supply to the base stops, the custom IC 10 starts outputting the voltage Vs to the contacts. The level of the voltage Vs is set to the source voltage (DC 12V) or the clamped voltage (DC 5V) according to an operating condition of the clamp circuit 20. The clamp circuit 20 is activated or deactivated according to a voltage adjusting signal outputted from the microcomputer 30.

A bias current flows through the transistor Tr when the switching circuit 22 is closed, which turns on the transistor Tr. If the switching circuit 16 is open, the voltage Vs at the output path is clamped to a voltage level determined based on a breakdown voltage of the zener diode ZD. Therefore, the voltage Vs outputted from the custom IC 10 under this condition is at a low level (5V).

When the switching circuit 22 is open, the transistor Tr turns off. As a result, the anode of the zener diode ZD is open. If the switching circuit 16 is open, the voltage Vs at the output path is set to the source voltage (12V). Therefore, the voltage Vs outputted from the custom IC 10 under this condition is at a high level (12V). The start and stop of outputting the voltage Vs is controlled by turning on or off the switching circuits 16 and 22. The level adjustment of the voltage Vs is also controlled by turning on or off the switching circuits 16 and 22.

One of the contacts of each switch SW1–SWn is grounded. The other contact is connected to an output terminal of the custom IC 10 at which the sampling voltage Vs appears via the resistor Ra1–Ran corresponding to the switch SW1–SWn. The other terminal is also connected to an I/O port of the microcomputer 30 via the resistor Rb1–Rbn corresponding to the switch SW1–SWn.

The microcomputer 30 includes a CPU 32 as a main component. The microcomputer 30 measures a voltage across the switch SW1–SWn to judge whether a current flows across the switch SW1–SWn. The microcomputer 30 determines the status of the switch SW1–SWn based on the judgment, and executes various logic operations for controlling a device corresponding to the. switch SW1–SWn.

The microcomputer 30 also includes an auto-read circuit 36 and a wakeup circuit 38. The auto-read circuit 36 automatically reads voltage across the contacts of each switch SW1–SWn via the I/O port 34 when the CPU 32 is in a sleep state. It determines the status of the switch SW1–SWn based on the read voltage. The wakeup circuit 38 activates the CPU 32 when the auto-read circuit 36 determines that the switch SW1–SWn is turned on. In other words, the CPU 32 is restarted from the sleep state when the switches SW1–SWn are turned on during the state and executes control processes corresponding to the switching operation.

The wakeup circuit 38 not only activates the CPU 32 but also outputs sampling signals CK at intervals determined by the CPU 32. The sampling signals CK are inputted to the custom IC 10. The custom IC 10 periodically produces the sampling voltage Vs. When the CPU 32 is in the sleep state, the wakeup circuit 38 activates the CPU 32 based on the determined signal outputted from the auto-read circuit 36 during the sampling signals CK are outputted.

The microcomputer 30 has two output ports connected to logic input terminals A and B of the custom IC 10, in addition to the output terminal for outputting the sampling signals CK to the custom IC 10. The signal levels at the output ports vary depending on operations of the CPU 32. When the control for the devices operated by the switches SW1–SWn is required, the signal level at the output port connected to the logic input terminal B is high. The level is always high regardless of the state of the CPU 32, which is the sleep state or the wakeup state.

The level at the output port connected to the logic input terminal A becomes high only when the CPU 32 is in the wakeup state. When the CPU 32 is in the sleep state, the level becomes high every a few seconds in synchronization with the sampling signal CK. This signal level adjustments during the CPU 32 is in the sleep state are performed by a timer (not shown) or the CPU 32 that is temporarily activated by the activation signal from the wakeup circuit 38.

The input terminals of the custom IC 10 are connected to the output terminals of the microcomputer 30. Logic input terminals A and B are connected to the switching circuit 22 and one of input terminals of the AND circuit 24, respectively. The sampling signal input terminal is connected to the other input terminal of the AND circuit 24. An output terminal of the AND circuit 24 is connected to the switching circuit 16.

The switching circuits 16, 22 are turned off when the input at the logic input terminal A or the input from the AND circuit is high. When the input is low, the circuits 16, 24 are turned on. Therefore, the custom IC 10 stops outputting the sampling voltage Vs regardless of the levels of the logic input A and the sampling signal CK when the logic input B is low. The relationships among the logic inputs A, B and the sampling voltage Vs are shown in table 1.

When the logic input B is high, the custom IC outputs the sampling voltage Vs in synchronization with the sampling signal CK. The sampling voltage Vs is at high level (12V) when the logic input A is high. The sampling voltage Vs is at low level (5V) when the logic input B is low. The logic inputs A and B are used as a voltage adjusting signal, which activates or deactivates the clamp circuit 20.

TABLE 1

| Logic input A | Logic input B | Sample voltage |
| --- | --- | --- |
| Low | Low | No output |
| Low | High | 5 V |
| High | Low | No output |
| High | High | 12 V |

When the CPU 32 is in a wakeup state, the logic inputs A and B are maintained high. When the CPU 32 is in a sleep state, the logic input B is maintained high and the logic input A alters between low and high at intervals longer than a cycle of the sampling signal CK. As a result, the custom IC 10 outputs a high-level sampling voltage Vs in synchronization with the sampling signal CK when the CPU 32 is in the wakeup state.

The custom IC 10 outputs a low-level sampling voltage Vs in synchronization with the sampling signal CK when the CPU 32 is in the sleep state. The low-level sampling voltage Vs is periodically raised to the high level. This decreases the power consumption of the custom IC 10 during the switching status determination when the CPU 32 is in the sleep state. To reduce the power consumption, the sampling voltage Vs is decreased. However, the sampling voltage Vs is periodically raised to the high level. This makes the contacts of the switches SW1–SWn active even after the vehicle is parked for a while because the high-level voltage breaks isolation films formed on the contacts.

The status of the switches SW1–SWn is properly determined while the power consumption is reduced when the CPU 32 is in the sleep state. The clamp circuit 20 is used for adjusting the sampling voltage Vs between the high level and the low level. The clamp circuit 20 has a simple configuration constructed of the zener diode ZD and the transistor Tr. This makes the configuration of the custom IC 10 as well.

The present invention should not be limited to the embodiment previously discussed and shown in the figures, but may be implemented in various ways without departing from the spirit of the invention. For example, the voltage application device, the determination device, and the voltage adjusting device may be integrated into the custom IC 10. Alternatively, the functions of these devices may be performed by the microcomputer 30.

The switching status determination device may be used for portable information terminals or other devices that require reduction in power consumption.

What is claimed is:

1. A switch status determination device comprising:
   a voltage application means that periodically applies a direct current voltage between contacts contacts of a manual switch of a device;
   a determination means that determines a status of the manual switch; and
   a voltage adjusting means for adjusting the levels of the direct current voltage applied between the contacts, wherein
   the voltage application means produces at least high and low levels of the direct current voltage for applying between the contacts,
   the determination means determines the status of the manual switch by detecting whether a current flows between the contacts when the direct current voltage is applied and the determined status is used for control of the device having the manual switch, the control is performed by a control device, wherein;
   the voltage adjusting means adjusts the direct current voltage between a low non-zero level and a high non-zero level when the control device is in a non-operational state, and
   the voltage adjusting means controls the direct current voltage at the high non-zero level when the control device is in an operational state.

2. The switch status determination device according to claim 1, wherein the determination means produces an activation signal for activating the control device when the determination result shows that the status of the manual switch is altered while the control device is in the non-operational state.

3. The switch status detennination device according to claim 1, wherein:
   the voltage application means includes a clamp circuit for a voltage clamp in a voltage output path;
   the clamp circuit is activated or deactivated according to a voltage adjusting signal from the voltage adjusting means; and
   the direct current voltage applied between the contacts of the manual switch is adjusted at a high level or a low level according to an operating condition of the clamp circuit.

4. The switch status determination device according to claim 1, wherein the determination means includes:
   a processing unit that determines the status of the manual switch;
   an auto-read circuit that automatically reads a voltage across the contacts; and
   a processing unit activation means that sends an activation signal to the processing unit when the determination result shows that the status of the manual switch is altered while the processing unit is in the non-operational state.

5. The switch status determination device according to claim 1, wherein the device having the manual switch is installed in a vehicle.

6. A method for determining a switching status of a manual switch of a device, comprising:
   periodically applying a direct current voltage between contacts of the manual switch;
   detecting a current flowing between the contacts;
   determining a status of the manual switch based on the current detection;
   sending a determination result to a control device that controls the device having the manual switch,
   adjusting the direct current voltage between a low non-zero level and a high non-zero level when the control device is in a non-operational state; and
   controlling the direct current voltage at the high non-zero level when the control device is in an operational state.

7. The method for determining a switching status according to claim 6, wherein the direct current voltage is adjusted lower when a determination means used in the determining step is in the non-operational state than when the determination means is in the operational state.

8. The method for determining a switching status according to claim 6, wherein the direct current voltage is periodically adjusted to the high non-zero level.

9. The method for determining a switching status according to claim 6, further comprising steps of:
   automatically reading a voltage across the contacts;
   determining the status of the manual switch based on the read voltage;
   activating a processing unit that is included in the control device when the determination result shows that the status of the switch is altered while the processing unit is in the non-operational state.

10. The switch status determination device according to claim 1,
    wherein the voltage application means periodically applies a direct current voltage of a low level for a first period between the contacts, and periodically applies a direct current voltage of a high level between the contacts for a second period, when the control device is in the non-operational state, and
    the second period is longer than the first period.

11. The method of claim 6, further comprising producing an activation signal for activating the control device when the determination result shows that the status of the manual switch is altered while the control device is in the non-operational state.

* * * * *